US012565608B2

(12) United States Patent
Kushihara et al.

(10) Patent No.: US 12,565,608 B2
(45) Date of Patent: Mar. 3, 2026

(54) THERMALLY CONDUCTIVE RESIN COMPOSITION

(71) Applicant: Shin-Etsu Chemical Co., Ltd., Tokyo (JP)

(72) Inventors: Naoyuki Kushihara, Annaka (JP); Masahiro Kaneta, Annaka (JP); Kazuaki Sumita, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 610 days.

(21) Appl. No.: 18/106,157

(22) Filed: Feb. 6, 2023

(65) Prior Publication Data

US 2023/0250328 A1 Aug. 10, 2023

(30) Foreign Application Priority Data

Feb. 7, 2022 (JP) ................................ 2022-016813

(51) Int. Cl.
*C09K 5/14* (2006.01)
*C08K 7/18* (2006.01)

(52) U.S. Cl.
CPC .................. *C09K 5/14* (2013.01); *C08K 7/18* (2013.01); *C08K 2201/001* (2013.01); *C08K 2201/005* (2013.01); *C08K 2201/006* (2013.01)

(58) Field of Classification Search
CPC ................ C09K 5/14; C08K 2201/001; C08K 2201/005; C08K 2003/2227; C08K 2003/282; C08K 3/22; C08K 3/28; C08K 7/18
See application file for complete search history.

(56) References Cited

U.S. PATENT DOCUMENTS

| | | | | |
|---|---|---|---|---|
| 2015/0299550 | A1 | 10/2015 | Kusunoki et al. | |
| 2019/0359873 | A1* | 11/2019 | Konishi ................ | C08L 101/00 |
| 2021/0238421 | A1* | 8/2021 | Noguchi ................ | C08K 3/013 |

FOREIGN PATENT DOCUMENTS

| | | | |
|---|---|---|---|
| JP | 2005-290076 | A | 10/2005 |
| JP | 2015-218192 | A | 12/2015 |
| JP | 2016-104832 | A | 6/2016 |
| JP | 2017-57340 | A | 3/2017 |
| JP | 2020-117688 | A | 8/2020 |
| JP | 2021-13034 | A | 2/2021 |
| JP | 2021-31600 | A | 3/2021 |
| WO | WO 2013/100174 | A1 | 7/2013 |

OTHER PUBLICATIONS

"Denka Spherical Alumina," Denka, 2024, 7 pages, with an English abstract.

Japanese Office Action for Japanese Application No. 2022-016813, dated Dec. 17, 2024, with English translation.

* cited by examiner

*Primary Examiner* — Angela C Brown-Pettigrew
*Assistant Examiner* — Aja Aryanna Walker
(74) *Attorney, Agent, or Firm* — Birch, Stewart, Kolasch & Birch, LLP

(57) ABSTRACT

Provided is a resin composition that has a low viscosity when in the state of a composition, and provides a cured product having a high thermal conductivity, a high resin strength and a high adhesive force. The composition is a thermally conductive resin composition containing:

(A) 100 parts by mass of a heat-curable resin containing at least one kind selected from an epoxy resin, a cyclic imide compound and a cyanate ester resin; and (B) a thermally conductive filler that has a thermal conductivity of not smaller than 10 W/m·K, and is in an amount of 100 to 3,000 parts by mass per 100 parts by mass of the component (A), wherein the component (B) contains therein 40 to 85% by mass of a thermally conductive filler (B1) that has an average particle size of 35 to 200 μm and a specific surface area of not larger than 0.3 $mm^2/g$.

5 Claims, No Drawings

THERMALLY CONDUCTIVE RESIN COMPOSITION

BACKGROUND OF THE INVENTION

Field of the Invention

The present invention relates to a thermally conductive resin composition.

Background Art

In recent years, with regard to electronic parts used in a wide range of fields such as automobiles, railways and power generators, there are now more demands on achieving higher performances such as larger rated voltages and rated currents and broader operating temperature ranges.

Higher performances of electronic parts entail larger amounts of heat generated therefrom. Thus, a high thermal conductivity is required for an encapsulation material used to protect electronic parts, and for an adhesive agent used to assemble them.

Conventionally, as a highly thermally conductive resin, there has been considered a composition with aluminum oxide being used in an epoxy resin as a highly thermally conductive filler (JP-A-2021-13034). Further, for the purpose of improving thermal conductivity, there has also been considered a composition using boron nitride and/or magnesium oxide as a highly thermally conductive filler (JP-A-2021-31600 and JP-A-2020-117688).

However, there has been a problem where as a result of adding a large amount of a thermally conductive filler(s) to improve thermal conductivity, resin viscosity will rise significantly so that voids will occur at the time of molding, whereby thermal conductivity will decrease eventually. Further, there has been considered a method of adding a solvent to reduce resin viscosity; however, this method has a problem that crosslinking of the resin will be insufficient due to the usage of a solvent, whereby a cured product will exhibit a deteriorated resin strength and adhesive force.

SUMMARY OF THE INVENTION

Thus, it is an object of the present invention to provide a resin composition that is superior in fluidity, and whose cured product has a high thermal conductivity and an excellent adhesiveness, heat resistance and moisture resistance.

The inventors of the present invention diligently conducted a series of studies to solve the above problems, and completed the invention by finding that a heat-curable resin composition shown below was able to achieve the aforementioned object.

That is, the present invention is to provide the following thermally conductive resin composition.

[1]

A thermally conductive resin composition comprising:

(A) 100 parts by mass of a heat-curable resin containing at least one kind selected from an epoxy resin, a cyclic imide compound and a cyanate ester resin; and (B) a thermally conductive filler that has a thermal conductivity of not smaller than 10 W/m·K, and is in an amount of 100 to 3,000 parts by mass per 100 parts by mass of the component (A), wherein the component (B) contains therein 40 to 85% by mass of a thermally conductive filler (B1) that has an average particle size of 35 to 200 μm and a specific surface area of not larger than 0.3 $mm^2/g$.

[2]

The thermally conductive resin composition according to [1], wherein the heat-curable resin (A) contains an epoxy resin having at least two epoxy groups per molecule.

[3]

The thermally conductive resin composition according to [1], wherein the heat-curable resin (A) contains a cyclic imide compound having at least two cyclic imide groups per molecule.

[4]

The thermally conductive resin composition according to any one of [1] to [3], wherein the thermally conductive filler (B) is one kind or a combination of at least two kinds selected from zinc oxide, aluminum oxide, silicon oxide, magnesium oxide, aluminum nitride, boron nitride, silicon nitride and metallic silicon.

[5]

The thermally conductive resin composition according to any one of [1] to [4], wherein the thermally conductive resin composition is liquid at 25° C.

The thermally conductive resin composition of the present invention has a low viscosity and is superior in fluidity as being liquid particularly at 25° C.; and the cured product thereof has a high thermal conductivity and an excellent adhesiveness, heat resistance and moisture resistance. Further, since the thermally conductive resin composition of the present invention has a low viscosity even without addition of a solvent, there is less burden on the environment by a volatilized solvent, which has always been a concern if using a solvent to reduce viscosity.

Thus, the thermally conductive resin composition of the present invention is useful as an encapsulation material and adhesive agent for electronic parts used in a wide range of fields.

DETAILED DESCRIPTION OF THE INVENTION

The present invention is described in detail hereunder.

(A) Heat-Curable Resin

A component (A) used in the present invention is a heat-curable resin. The heat-curable resin in the present invention contains at least one kind selected from an epoxy resin, a cyclic imide compound and a cyanate ester resin. In terms of, for example, moldability and reliability, it is preferred that the heat-curable resin contain an epoxy resin or a cyclic imide compound.

There are no particular limitations on the type of the epoxy resin; a generally known epoxy resin may be used. As such epoxy resin, preferred are those having at least two epoxy groups per molecule, examples of which may include a bisphenol A-type epoxy resin, a bisphenol F-type epoxy resin, a bisphenol S-type epoxy resin, a phenol novolac-type epoxy resin, a cresol novolac-type epoxy resin, a bisphenol A novolac-type epoxy resin, a bisphenol F novolac-type epoxy resin, a stilbene-type epoxy resin, a triazine frame-containing epoxy resin, a fluorene frame-containing epoxy resin, a trisphenol alkane-type epoxy resin, a biphenyl-type epoxy resin, a xylylene-type epoxy resin, a biphenyl aralkyl-type epoxy resin, a naphthalene-type epoxy resin, a dicyclopentadiene-type epoxy resin, an alicyclic epoxy resin, a silicone-modified epoxy resin, a butadiene-modified epoxy resin, diglycidylether compounds of polycyclic aromatics such as multifunctional phenols and anthracene, and phosphorous-containing epoxy resins with a phosphorous compound(s) being introduced into any of the above examples. Any one kind of these epoxy resins may be used alone, or two or more kinds of them may be used in combination.

There are no particular limitations on the type of the cyclic imide compound; a generally known cyclic imide compound may be used. As such cyclic imide compound, preferred are those having at least two cyclic imide groups per molecule; for example, a cyclic imide compound represented by the following formula (1) is preferred.

(1)

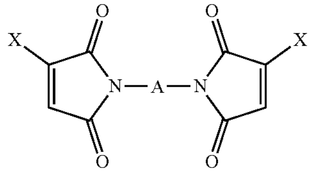

In the formula (1), A represents a divalent organic group. X independently represents a hydrogen atom or a methyl group.

Further, in terms of achieving a low elasticity and excellent dielectric properties (low relative permittivity and low dielectric tangent) after curing, it is more preferred that the divalent organic group represented by A in the cyclic imide compound be that selected from the groups having the following structures and a dimer acid frame-derived hydrocarbon group.

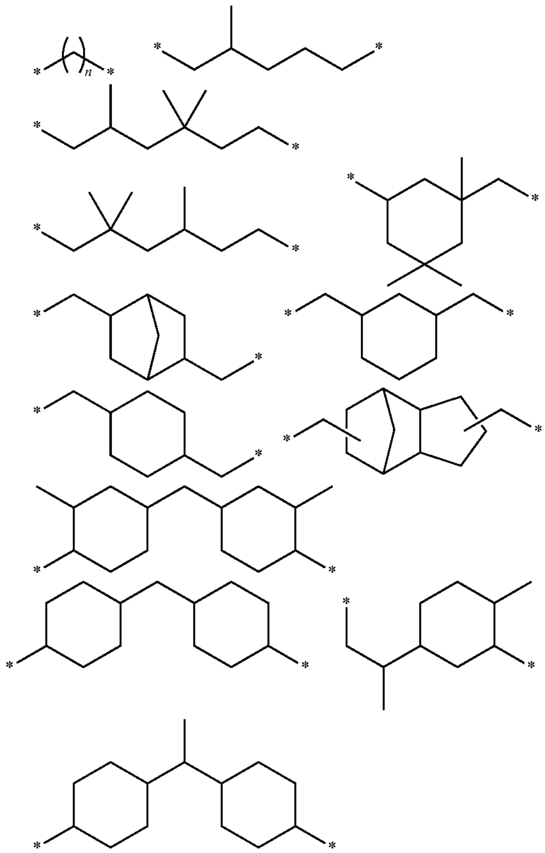

-continued

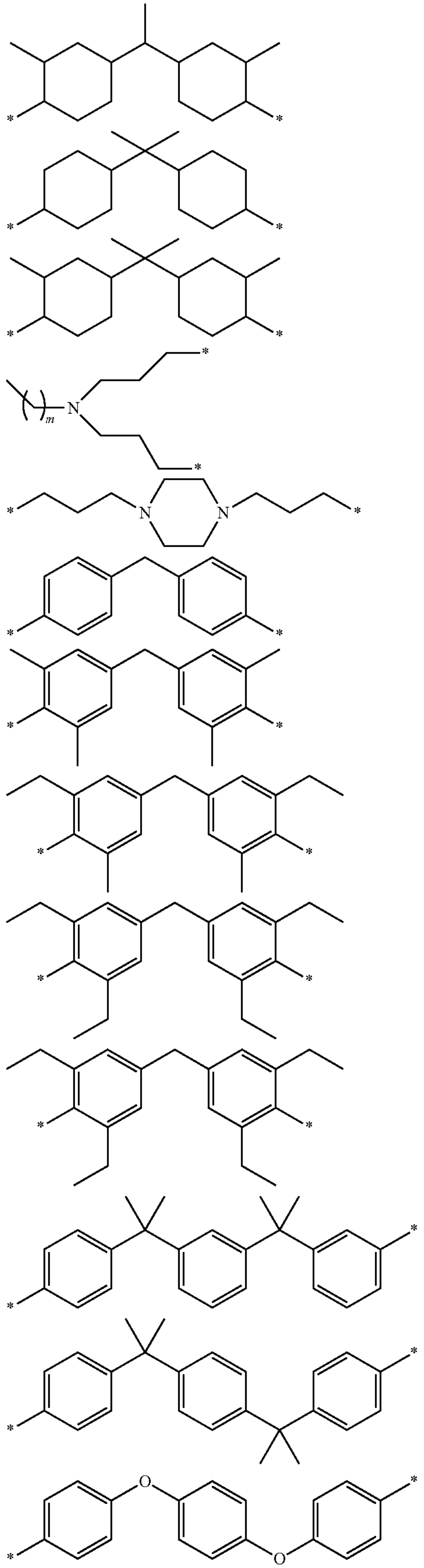

-continued

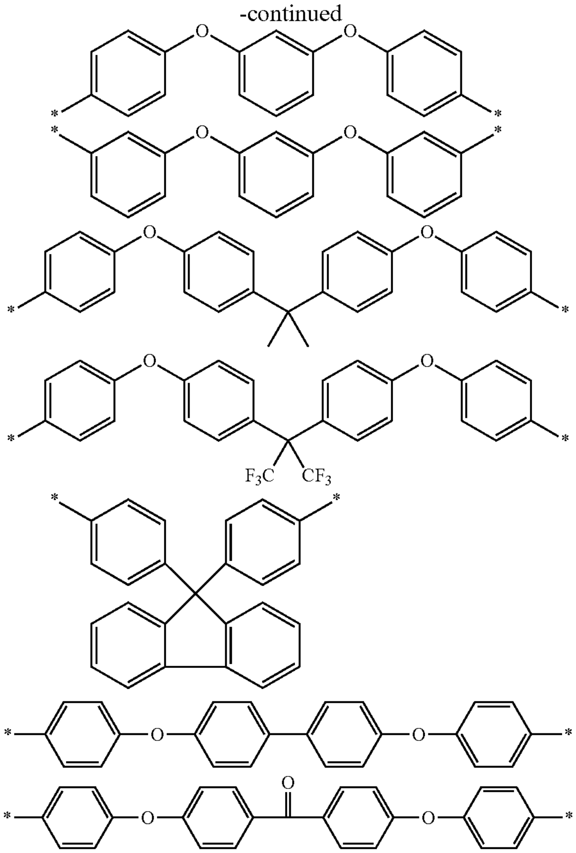

In the above formulae, * represents a bond to a nitrogen atom in an imide group; n is 1 to 20; m is 0 to 20.

A dimer acid is a liquid dibasic acid whose main component is a dicarboxylic acid having 36 carbon atoms, which is produced by dimerizing an unsaturated fatty acid having 18 carbon atoms and employing a natural substance such as a vegetable fat or oil as its raw material; a dimer acid frame may contain multiple structures as opposed to one single type of frame, and there exist several types of isomers. Typical dimer acids are categorized under the names of (a) linear type, (b) monocyclic type, (c) aromatic ring type, and (d) polycyclic type.

In this specification, a dimer acid frame refers to a group induced from a dimer diamine having a structure established by substituting the carboxy groups in such dimer acid with primary aminomethyl groups.

That is, as the dimer acid frame-derived hydrocarbon group contained in the cyclic imide compound as one kind of the component (A), there may be employed, for example, a branched divalent hydrocarbon group obtained by substituting the two carboxy groups in any of the following dimer acids (a) to (d) with methylene groups; however, the hydrocarbon group shall not be limited to such branched divalent hydrocarbon group.

Further, when the cyclic imide compound as one kind of the component (A) has a dimer acid frame-derived hydrocarbon group, from the perspectives of heat resistance and reliability of a cured product, it is more preferred that such dimer acid frame-derived hydrocarbon group be one having a structure with a reduced number of carbon-carbon double bonds in the dimer acid frame-derived hydrocarbon group due to a hydrogenation reaction.

(a)

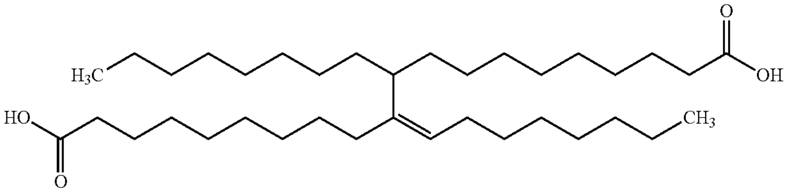

(b)

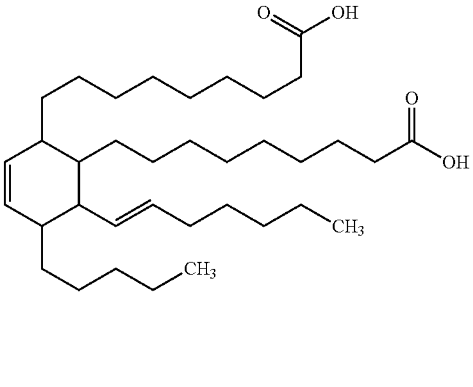

-continued

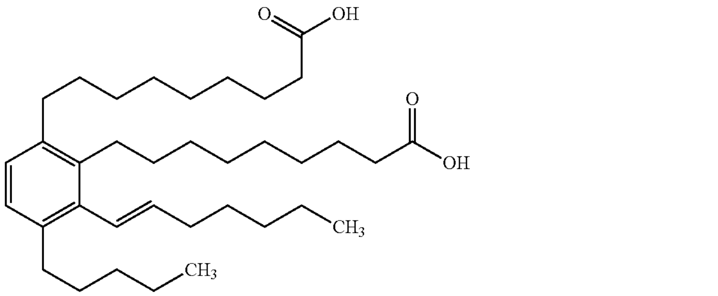

(c)

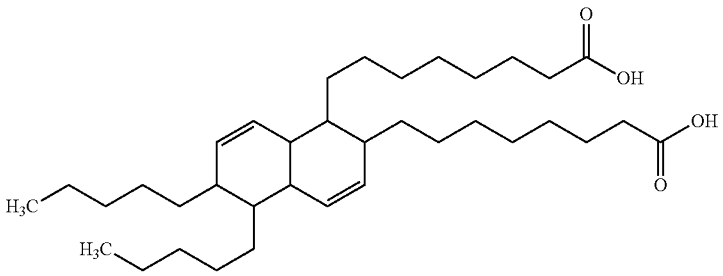

(d)

In terms of dielectric properties and flexibility of the cured product, it is particularly preferred that the divalent organic group represented by A in the formula (1) be a group derived from diamines such as 2-methyl-1,5-diaminopentane, 2,2,4-trimethylhexamethylenediamine, 1,3-bis[2-(4-aminophenyl)-2-propyl]benzene, 1,4-bis[2-(4-aminophenyl)-2-propyl)benzene, 2,2-bis[4-(4-aminophenoxy)phenyl] propane and 2,2-bis[4-(4-aminophenoxy)phenyl] hexafluoropropane (i.e. a group obtained by excluding two amino groups in any of these diamines); or a dimer acid frame-derived divalent hydrocarbon group.

Any one kind of these cyclic imide compounds may be used alone, or two or more kinds of them may be used in combination.

There are no particular limitations on the cyanate ester resin so long as it has at least one cyanato group per molecule; a generally known cyanate ester resin may be used. Examples of the cyanate ester resin include a bisphenol-type cyanate ester such as 1,1-bis(4-cyanatophenyl) ethane, bis(3-methyl-4-cyanatophenyl)methane, bis(3-ethyl-4-cyanatophenyl)methane, bis(3,5-dimethyl-4-cyanatophenyl)methane, 2,2-bis(4-cyanatophenyl)propane, 2,2-bis(4-cyanatophenyl)-1,1,1,3,3,3-hexafluoropropane, diallyl bisphenol A-type cyanate ester and diallyl bisphenol F-type cyanate ester; a biphenyl-type cyanate ester such as 2,2'-dicyanatobiphenyl, 4,4'-dicyanatobiphenyl and 3,3',5,5'-tetramethyl-4,4'-dicyanatobiphenyl; a cyanatobenzene such as 1,3-dicyanatobenzene, 1,4-dicyanatobenzene, 2-tert-butyl-1,4-dicyanatobenzene, 2,4-dimethyl-1,3-dicyanatobenzene, 2,5-di-tert-butyl-1,4-dicyanatobenzene, tetramethyl-1,4-dicyanatobenzene and 1,3,5-tricyanatobenzene; a cyanatonaphthalene such as 1,3-dicyanatonaphthalene, 1,4-dicyanatonaphthalene, 1,5-dicyanatonaphthalene, 1,6-dicyanatonaphthalene, 1,8-dicyanatonaphthalene, 2,6-dicyanatonaphthalene, 2,7-dicyanatonaphthalene and 1,3,6-tricyanatonaphthalene; bis(4-cyanatophenyl)ether; 4,4'-(1,3-phenylenediisopropylidene)diphenylcyanate; bis(4-cyanatophenyl)thioether; and bis(4-cyanatophenyl)sulfone.

Any one kind of these cyanate ester resins may be used alone, or two or more kinds of them may be used in a mixed manner. Of the above examples, preferable cyanate ester resins are 1,1-bis(4-cyanatophenyl)ethane, diallyl bisphenol A-type cyanate ester and diallyl bisphenol F-type cyanate ester. More preferred are 1,1-bis(4-cyanatophenyl)ethane and diallyl bisphenol F-type cyanate ester.

(B) Thermally Conductive Filler

A thermally conductive filler as a component (B) is added to improve thermal conductivity. There is used a thermally conductive filler having a thermal conductivity of not smaller than 10 W/m·K, preferably not smaller than 15 W/m·K. If the thermal conductivity of the component (B) is smaller than 10 W/m·K, the thermal conductivity of a resin composition itself will be small.

There are no particular limitations on the type of the thermally conductive filler; a generally known thermally conductive filler may be used. There may be listed, for example, zinc oxide, aluminum oxide, silicon oxide, magnesium oxide, aluminum nitride, boron nitride, silicon nitride and metallic silicon. Any one kind of these thermally conductive fillers may be used alone, or two or more kinds of them may be used in combination.

The thermally conductive filler as the component (B) is characterized by containing, at particular compounding ratios, thermally conductive fillers with particular particle sizes and specific surface areas. The component (B) is added in an amount of 100 to 3,000 parts by mass, preferably 300 to 2,400 parts by mass, more preferably 500 to 1,900 parts by mass, per 100 parts by mass of the component (A).

Further, the thermally conductive filler as the component (B) contains therein 40 to 85% by mass of a thermally conductive filler (B1) having an average particle size of 35 to 200 μm and a specific surface area of not larger than 0.3 $mm^2/g$.

The average particle size of the component (B1) is 35 to 200 μm, preferably 45 to 150 μm, more preferably 50 to 130 μm. An average particle size of smaller than 35 μm will make it difficult to improve thermal conductivity, and cause the viscosity of the resin composition to rise so that a poor moldability will be exhibited. Moreover, an average particle size of larger than 200 μm will impair the insulation property of the resin composition.

The specific surface area is not larger than 0.3 $mm^2/g$; a specific surface area of larger than 0.3 $mm^2/g$ will cause the viscosity of the resin composition to rise significantly and the moldability thereof to deteriorate.

When the component (B1) is contained in an amount of smaller than 40% by mass in the component (B), it will be difficult to improve the thermal conductivity of the resin composition; when the component (B1) is contained in an amount of larger than 85% by mass in the component (B), the viscosity of the composition will rise significantly so that a poor moldability will be exhibited. The component (B1) is in an amount of 40 to 2,550 parts by mass, preferably 160 to 2,100 parts by mass, per 100 parts by mass of the component (A). One kind of the thermally conductive filler may be used alone, or two or more kinds thereof may be used in a combined manner.

Further, in terms of achieving a higher fluidity of the thermally conductive resin composition of the present invention, the thermally conductive filler may also be one prepared by combining those from multiple particle size ranges; in such case, it is preferred that the thermally conductive filler be prepared by combining those from a minute region of 0.1 to 3 μm and those from a medium particle size region of 3 to 35 μm.

In the present invention, the average particle size is a value of a cumulative average particle size (median diameter) on a volumetric basis that is measured by Microtrac MT3300EX which is a particle size analyzer manufactured by Nikkiso Co., Ltd. Further, in the present invention, the specific surface area can be measured by a gas adsorption method; for example, the specific surface area can be measured by an automatic specific surface area measurement system or the like that is manufactured by Shimadzu Corporation.

Other Additives

The thermally conductive resin composition of the present invention can be obtained by combining given amounts of the components (A) and (B); however, other additives may also be added thereto if necessary, provided that the purposes and effects of the present invention will not be undermined. Examples of such additives include a curing agent, a curing accelerator, a flame retardant, an ion-trapping material, an antioxidant, a coupling agent and a colorant.

Curing Agent

The heat-curable resin composition may also contain a curing agent for promoting a curing reaction of the heat-curable resin as the component (A). There are no particular limitations on the type of the curing agent, and a generally known curing agent may be used depending on the type of the heat-curable resin as the component (A).

As a curing agent when the heat-curable resin is an epoxy resin, there may be listed, for example, an amine-based curing agent, a phenolic curing agent, an acid anhydride-based curing agent and a thiol-based curing agent. In terms of moldability and thermal conductivity, an amine-based curing agent, a phenolic curing agent and an acid anhydride-based curing agent are preferable as curing agents.

Examples of an amine-based curing agent include aromatic diaminodiphenylmethane compounds such as 3,3'-diethyl-4,4'-diaminodiphenylmethane, 3,3',5,5'-tetramethyl-4,4'-diaminodiphenylmethane, and 3,3',5,5'-tetraethyl-4,4'-diaminodiphenylmethane; dimethylthiotoluenediamine; diethyltoluenediamine; 2,4-diaminotoluene; 1,4-diaminobenzene; and 1,3-diaminobenzene. Any one kind of these amine-based curing agents may be used alone, or two or more kinds of them may be used in combination.

If an amine-based curing agent is used as a curing agent, it is preferred that a molar ratio of all the amino groups in the amine-based curing agent(s) per 1 mol of the epoxy groups contained in the epoxy resin be 0.7 to 1.2, more preferably 0.7 to 1.1, even more preferably 0.85 to 1.05.

Examples of a phenolic curing agent include a phenol novolac resin, a naphthalene ring-containing phenolic resin, an aralkyl-type phenolic resin, a trisphenol alkane-type phenolic resin, a biphenyl frame-containing aralkyl-type phenolic resin, a biphenyl-type phenolic resin, an alicyclic phenolic resin, a heterocyclic phenolic resin, a resorcinol-type phenolic resin, an allyl group-containing phenolic resin, and a bisphenol-type phenolic resin such as a bisphenol A-type resin and bisphenol F-type resin. Any one kind of these phenolic curing agents may be used alone, or two or more kinds of them may be used in combination.

If a phenolic curing agent is used as a curing agent, it is preferred that a molar ratio of the phenolic hydroxyl groups contained in the curing agent(s) per 1 mol of the epoxy groups contained in the epoxy resin be 0.5 to 1.5, more preferably 0.8 to 1.2.

Examples of an acid anhydride-based curing agent include 3,4-dimethyl-6-(2-methyl-1-propenyl)-1,2,3,6-tetrahydrophthalic anhydride, 1-isopropyl-4-methyl-bicyclo [2.2.2]oct-5-ene-2,3-dicarboxylic anhydride, methyltetrahydrophthalic anhydride, methylhexahydrophthalic anhydride, hexahydrophthalic anhydride, methylhimic anhydride, pyromellitic dianhydride, maleated alloocimene, benzophenonetetracarboxylic dianhydride, 3,3',4,4'-biphenyltetrabisbenzophenone tetracarboxylic dianhydride, (3,4-dicarboxyphenyl)ether dianhydride, bis(3,4-dicarboxyphenyl)methane dianhydride, and 2,2-bis(3,4-dicarboxyphenyl)propane dianhydride. Any one kind of these acid anhydride-based curing agents may be used alone, or two or more kinds of them may be used in combination.

If an acid anhydride-based curing agent is used, it is preferred that an equivalent ratio of the acid anhydride groups (—CO—O—CO—) in the curing agent(s) to the epoxy groups in the epoxy resin (A) be 0.5 to 1.5.

Examples of a thiol-based curing agent include trimethylolpropane tris(3-mercaptopropionate), tris-[(3-mercaptopropionyloxy)-ethyl]-isocyanurate, pentaerythritol tetrakis (3-mercaptopropionate), dipentaerythritol hexakis(3-mercaptopropionate), pentaerythritol tetrakis(3-mercaptobutyrate), 1,3,5-tris(3-mercaptobutyryloxyethyl)-1,3,5-triazine-2,4,6(1H,3H,5H)-trione, 1,3,4,6-tetrakis (mercaptomethyl)glycoluril, 1,3,4,6-tetrakis(2-mercaptoethyl)glycoluril, 1,3,4,6-tetrakis(3-mercaptopropyl)glycoluril, 1,3,4,6-tetrakis (mercaptomethyl)-3a-methylglycoluril, 1,3,4,6-tetrakis(2-mercapto ethyl)-3a-methylglycoluril, 1,3,4,6-tetrakis(3-mercaptopropyl)-3a-methylglycoluril, 1,3,4,6-tetrakis (mercaptomethyl)-3a, 6a-dimethylglycoluril, 1,3,4,6-tetrakis(2-mercaptoethyl)-3a, 6a-dimethylglycoluril, 1,3,4, 6-tetrakis(3- mercaptopropyl)-3a, 6a-dimethylglycoluril, 1,3,4,6-tetrakis(mercaptomethyl)-3a, 6a-diphenylglycoluril, 1,3,4,6-tetrakis(2-mercaptoethyl)-3a, 6a-diphenylglycouril, and 1,3,4,6-tetrakis(3-mercaptopropyl)-3a,6a-diphenylglycoluril. Any one kind of these thiol-based curing agents may be used alone, or two or more kinds of them may be used in combination.

If a thiol-based curing agent is used as a curing agent, it is preferred that a molar ratio of all the thiol groups in the thiol-based curing agent(s) per 1 mol of the epoxy groups contained in the epoxy resin be 0.1 to 1.5, more preferably 0.2 to 1.2.

As a curing agent when the heat-curable resin is a cyclic imide compound, there may be listed, for example, a thermal radical polymerization initiator and a thermal anionic polymerization initiator.

Examples of a thermal radical polymerization initiator include organic peroxides such as methylethylketone peroxide, methylcyclohexanone peroxide, methylacetoacetate peroxide, acetylacetone peroxide, 1,1-bis(t-butylperoxy)3,3,5-trimethylcyclohexane, 1,1-bis(t-hexylperoxy)cyclohexane, 1,1-bis(t-hexylperoxy)3,3,5-trimethylcyclohexane, 1,1-bis(t-butylperoxy)cyclohexane, 2,2-bis(4,4-di-t-butylperoxycyclohexyl)propane, 1,1-bis(t-butylperoxy)cyclododecane, n-butyl-4,4-bis(t-butylperoxy)valerate, 2,2-bis(t-butylperoxy)butane, 1,1-bis(t-butylperoxy)-2-methylcyclohexane, t-butyl hydroperoxide, p-menthane hydroperoxide, 1,1,3,3-tetramethylbutyl hydroperoxide, t-hexyl hydroperoxide, dicumylperoxide, 2,5-dimethyl-2,5-bis(t-butylperoxy)hexane, α,α'-bis(t-butylperoxy)diisopropylbenzene, t-butylcumylperoxide, di-t-butylperoxide, 2,5-dimethyl-2,5-bis(t-butylperoxy)hexyne-3, isobutyryl peroxide, 3,5,5-trimethylhexanoyl peroxide, octanoyl peroxide, lauroyl peroxide, cinnamic acid peroxide, m-toluoyl peroxide, benzoyl peroxide, diisopropyl peroxydicarbonate, bis(4-t-butylcyclohexyl)peroxydicarbonate, di-3-methoxybutyl peroxydicarbonate, di-2-ethylhexyl peroxydicarbonate, di-sec-butyl peroxydicarbonate, di(3-methyl-3-methoxybutyl)peroxydicarbonate, di(4-t-butylcyclohexyl) peroxydicarbonate, α,α'-bis(neodecanoylperoxy) diisopropylbenzene, cumyl peroxyneodecanoate, 1,1,3,3-tetramethylbutyl peroxyneodecanoate, 1-cyclohexyl-1-methylethyl peroxyneodecanoate, t-hexyl peroxyneodecanoate, t-butyl peroxyneodecanoate, t-hexyl peroxypivalate, t-butyl peroxypivalate, 2,5-dimethyl-2,5-bis(2-ethylhexanoylperoxy)hexane, 1,1,3,3-tetramethylbutylperoxy-2-ethylhexanoate, 1-cyclohexyl-1-methylethylperoxy-2-ethylhexanoate, t-hexylperoxy-2-ethylhexanoate, t-butylperoxy-2-ethylhexanoate, t-butyl peroxyisobutyrate, t-butyl peroxymaleic acid, t-butyl peroxylaurate, t-butylperoxy-3,5,5-trimethylhexanoate, t-butylperoxyisopropyl monocarbonate, t-butylperoxy-2-ethylhexyl monocarbonate, 2,5-dimethyl-2,5-bis(benzoylperoxy)hexane, t-butylperoxy acetate, t-hexyl peroxybenzoate, t-butylperoxy-m-toluoyl benzoate, t-butyl peroxybenzoate, bis(t-butylperoxy) isophthalate, t-butylperoxyallyl monocarbonate, and 3,3',4,4'-tetra(t-butylperoxycarbonyl)benzophenone; and azo compounds such as 2,2'-azobis(N-butyl-2-methylpropionamide), 2,2'-azobis(N-cyclohexyl-2-methylpropionamide), 2,2'-azobis[N-(2-methylpropyl)-2-methylpropionamide], 2,2'-azobis[N-(2-methylethyl)-2-methylpropionamide], 2,2'-azobis(N-hexyl-2-methylpropionamide), 2,2'-azobis(N-propyl-2-methylpropionamide), 2,2'-azobis(N-ethyl-2-methylpropionamide), 2,2'-azobis[2-methyl-N-(2-hydroxyethyl)propionamide], 2,2'-azobis[N-(2-propenyl)-2-methylpropionamide], 2,2'-azobis{2-methyl-N-[1,1-bis(hydroxymethyl)-2-hydroxyethyl]propionamide}, 2,2'-azobis[N-(2-propenyl)-2-methylpropionamide], and dimethyl-1,1'-azobis(1-cyclohexanecarboxylate).

Examples of a thermal anionic polymerization initiator include imidazoles such as 2-methylimidazole, 2-ethylimidazole, 2-phenylimidazole, 2-ethyl-4-methylimidazole, 2-undecylimidazole, 1-cyanoethyl-2-ethyl-4-methylimidazole, and 2,4-diamino-6-[2-(2-methyl-1-imidazolyl)ethyl]-1,3,5-triazine; amine compounds such as triethylamine, triethylenediamine, 2-(dimethylaminomethyl)phenol, 1,8-diaza-bicyclo[5.4.0]undecene-7, tris(dimethylaminomethyl) phenol, and benzyldimethylamine; and organic phosphorus compounds such as triphenylphosphine, tributylphosphine, trioctylphosphine, tetrabutylphosphonium hexafluorophosphate, tetrabutylphosphonium tetraphenylborate, tetrabutylphosphonium acetate, tetraphenylphosphonium tetraphenylborate, tetraphenylphosphonium bromide, tetrabutylphosphonium bromide, tetrabutylphosphonium laurate, tetraphenylphosphonium hydrogen phthalate, bis(tetraphenylphosphonium)dihydrogen pyromellitate, and bis(tetrabutylphosphonium)dihydrogen pyromellitate. Among the above examples of polymerization initiator, preferred are thermal anionic polymerization initiators; more preferred are amine compounds and organic phosphorus compounds; particularly preferred are tetrabutylphosphonium laurate, tetraphenylphosphonium hydrogen phthalate, bis(tetraphenylphosphonium)dihydrogen pyromellitate, and bis(tetrabutylphosphonium)dihydrogen pyromellitate.

Any one kind of these curing agents for a cyclic imide compound may be used alone, or two or more kinds of them may be used in combination.

It is preferred that the curing agent(s) for a cyclic imide compound be added in an amount of 0.01 to 10 parts by mass, more preferably 0.1 to 5 parts by mass, even more preferably 0.3 to 3 parts by mass, per 100 parts by mass of the cyclic imide compound(s).

As a curing agent when the heat-curable resin is a cyanate ester resin, there may be listed, for example, an amine-based curing agent and a phenolic curing agent.

Examples of an amine-based curing agent include aromatic diaminodiphenylmethane compounds such as 3,3'-diethyl-4,4'-diaminodiphenylmethane, 3,3',5,5'-tetramethyl-4,4'-diaminodiphenylmethane, and 3,3',5,5'-tetraethyl-4,4'-diaminodiphenylmethane; dimethylthiotoluenediamine; diethyltoluenediamine; 2,4-diaminotoluene; 1,4-diaminobenzene; and 1,3-diaminobenzene. Any one kind of these amine-based curing agents may be used alone, or two or more kinds of them may be used in combination.

Examples of a phenolic curing agent include a phenol novolac resin, a naphthalene ring-containing phenolic resin, an aralkyl-type phenolic resin, a trisphenol alkane-type phenolic resin, a biphenyl frame-containing aralkyl-type phenolic resin, a biphenyl-type phenolic resin, an alicyclic phenolic resin, a heterocyclic phenolic resin, a resorcinol-type phenolic resin, an allyl group-containing phenolic resin, and a bisphenol-type phenolic resin such as a bisphenol A-type resin and bisphenol F-type resin. Any one kind of these phenolic curing agents may be used alone, or two or more kinds of them may be used in combination.

It is preferred that the curing agent(s) for a cyanate ester resin be added in an amount of 0.01 to 20 parts by mass, more preferably 0.1 to 15 parts by mass, even more preferably 0.3 to 10 parts by mass, per 100 parts by mass of the cyanate ester resin(s).

Curing Accelerator

The thermally conductive resin composition may also contain a curing accelerator. There are no particular limitations on the type of the curing accelerator, and a generally known curing accelerator may be used.

As such curing accelerator, there may be used, for example, a phosphorus-based compound such as triphenylphosphine, tributylphosphine, tri(p-methylphenyl)phosphine, tri(nonylphenyl)phosphine, triphenylphosphine-triphenylborane, and tetraphenylphosphine-tetraphenylborate; a tertiary amine compound such as triethylamine, benzyldimethylamine, α-methylbenzyldimethylamine, and 1,8-diazabicyclo[5.4.0]undecene-7; an imidazole compound such as 2-methylimidazole, 2-phenylimidazole, and 2-phenyl-4-methylimidazole; a peroxide; a urea compound; and a salicylic acid.

It is preferred that the curing accelerator be contained in an amount of 0.2 to 10 parts by mass, more preferably 0.5 to 5 parts by mass, per 100 parts by mass of the component (A).

Flame Retardant

The thermally conductive resin composition may contain a flame retardant to improve flame retardancy.

There are no particular limitations on such flame retardant, and a known flame retardant may be used. Examples thereof may include a phosphazene compound, silicone compound, zinc molybdate-supported talc, zinc molybdate-supported zinc oxide, aluminum hydroxide, magnesium hydroxide, molybdenum oxide, and antimony trioxide; any one kind of these flame retardants may be used alone, or two or more kinds of them may be used in combination. It is preferred that the flame retardant(s) be added in an amount of 2 to 100 parts by mass, more preferably 3 to 50 parts by mass, per 100 parts by mass of the component (A).

Ion-Trapping Material

The thermally conductive resin composition may contain an ion-trapping material to avoid deterioration in reliability that is caused by ion impurities.

There are no particular limitations on such ion-trapping material, and a known ion-trapping material may be used. There may be used, for example, hydrotalcites, a bismuth hydroxide compound, and a rare-earth oxide. Any one kind of these ion-trapping materials may be used alone, or two or more kinds of them may be used in combination. It is preferred that the ion-trapping material(s) be added in an amount of 0.5 to 25 parts by mass, more preferably 1.5 to 15 parts by mass, per 100 parts by mass of the component (A).

Coupling Agent

The thermally conductive resin composition may contain a coupling agent such as a silane coupling agent and a titanate coupling agent for the purpose of, for example, improving an adhesiveness between the heat-curable resin as well as its curing agent and the thermally conductive filler, or improving an adhesiveness of the composition to an insulating substrate; a silane coupling agent is particularly preferred.

Examples of such coupling agent include epoxy-functional alkoxysilanes such as γ-glycidoxypropyltrimethoxysilane, γ-glycidoxypropylmethyldiethoxysilane, and β-(3,4-epoxycyclohexyl)ethyltrimethoxysilane; amino-functional alkoxysilanes such as N-β-(aminoethyl)-γ-aminopropyltrimethoxysilane, γ-aminopropyltriethoxysilane, and N-phenyl-γ-aminopropyltrimethoxysilane; a mercapto-functional alkoxysilanes such as γ-mercaptopropyltrimethoxysilane; and amine-functional alkoxysilanes such as γ-aminopropyltrimethoxysilane and N-2-(aminoethyl)-3-aminopropyltrimethoxysilane.

The thermally conductive filler may be previously surface-treated with the coupling agent; or at the time of kneading the resin components such as the heat-curable resin as well as its curing agent together with the thermally conductive filler, the coupling agent may be added thereto so as to knead the composition while allowing the surface treatment to take place.

It is preferred that the coupling agent be added in an amount of 0.1 to 25 parts by mass, particularly preferably 0.5 to 20 parts by mass, per 100 parts by mass of the component (A). When the coupling agent is in an amount of not smaller than 0.1 parts by mass, there can be achieved a sufficient adhesion effect with respect to a base material; when the coupling agent is in an amount of not larger than 25 parts by mass, there will be no concern that a viscosity will drastically decrease to cause voids.

Colorant

The thermally conductive resin composition may also contain a colorant. Examples of such colorant include known colorants such as carbon black, an organic dye, an organic pigment, titanium oxide and colcothar. Carbon black is preferred in terms of dispersibility with respect to the heat-curable resin.

It is preferred that the colorant be added in an amount of 0.01 to 10 parts by mass, more preferably 0.1 to 5 parts by mass, per 100 parts by mass of the component (A).

The thermally conductive resin composition of the present invention is preferably liquid at 25° C. The viscosity of the composition at 25° C. is preferably 1 to 1,400 Pa·s, more preferably 5 to 1,000 Pa·s, particularly preferably 10 to 800 Pa·s. The viscosity is measured by a B-type viscometer in accordance with JIS Z 8803:2011.

There are no particular limitations on a method for producing the composition; and on a device for performing mixing, stirring and dispersion. For example, there may be used a grinding machine equipped with a stirrer and a heater, a twin roll mill, a triple roll mill, a ball mill, a planetary mixer or a mass colloider; these devices may also be appropriately used in a combined manner. Further, when performing stirring, mixing may be carried out under a reduced pressure in order to reduce air bubbles in the resin. There are no particular limitations on a curing condition(s) of the thermally conductive resin composition; the composition may for example be heated at a temperature of 60 to 200° C., preferably a temperature of 80 to 180° C. for 30 min to 10 hours, preferably for 1 to 5 hours.

Working Examples

The present invention is described in greater detail hereunder with reference to working and comparative examples; however, the present invention shall not be limited to the following working examples.

Components used in the working and comparative examples are as follows.

(A) Heat-Curable Resin (A1) Epoxy resin: mixed product of bisphenol A-type epoxy resin and bisphenol F-type epoxy resin (ZX1059 by NIPPON STEEL Chemical & Material CO., LTD.)

(A2) Cyclic imide compound: dimer acid frame-containing bismaleimide resin: (BMI-689 by Designer Molecules Inc.)

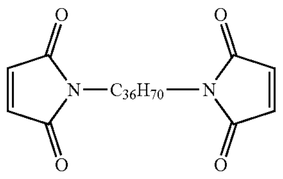

$C_{36}H_{70}$ in the above formula represents a dimer acid frame-derived hydrocarbon group.

(A3) Cyanate ester resin: Bis-E type cyanate ester resin: (LECy by LONZA Japan Ltd.)

(B) Thermally Conductive Filler (B1-1) Spherical aluminum oxide having a thermal conductivity of 30 W/m·K, an average particle size of 50 μm and a specific surface area of 0.2 $mm^2/g$ (B1-2) Spherical aluminum oxide having a thermal conductivity of 30 W/m·K, an average particle size of 120 μm and a specific surface area of 0.1 $mm^2/g$ (B1-3) Spherical aluminum nitride having a thermal conductivity of 150 W/m·K, an average particle size of 90 μm and a specific surface area of 0.1 $mm^2/g$ (B1-4) Spherical magnesium oxide having a thermal conductivity of 58 W/m·K, an average particle size of 120 μm and a specific surface area of 0.1 $mm^2/g$ (B2) Spherical aluminum oxide having a thermal conductivity of 30 W/m·K, an average particle size of 20 μm and a specific surface area of 0.2 $mm^2/g$ (B3) Spherical aluminum oxide having a thermal conductivity of 30 W/m·K, an average particle size of 5 μm and a specific surface area of 0.5 $mm^2/g$ (B4) Spherical aluminum oxide having a thermal conductivity of 30 W/m·K, an average particle size of 1 μm and a specific surface area of 1.0 $mm^2/g$ Other Components Amine-based curing agent: 3,3'-diethyl-4,4'-diaminodiphenylmethane (KAYAHARD AA by Nippon Kayaku Co., Ltd.)

Phenolic curing agent: bisphenol A-type allyl phenolic resin (DABPA by Daiwakasei Industry Co., LTD.)

Curing accelerator: 2-phenyl-4-methyl-5-hydroxymethylimidazole (2P4MHZ-PW by SHIKOKU CHEMICALS CORPORATION)

Polymerization initiator: dicumylperoxide (Perkadox BC-FF by KAYAKU NOURYON CORPORATION)

Silicone Resin Composition:

Here, 100 g of a polydimethylsiloxane (by Shin-Etsu Chemical Co., Ltd.) whose viscosity is 1,000 mPa·s and whose molecular chain ends are both blocked by dimethylvinylsiloxy groups, 2.4 g of a methylhydrogen silicone oil (by Shin-Etsu Chemical Co., Ltd.) whose viscosity is 20 $mm^2/s$, and 0.6 g of a vinylsiloxane complex of platinum (platinum concentration 1 wt %) were put into a 300 mL flask, followed by stirring them at room temperature for 30 min to obtain a silicone resin composition.

The resin compositions were prepared by mixing the above components at the compounding amounts (parts by mass) shown in Tables 1A and 1B. With regard to each composition as well as a cured product thereof (test piece) that was obtained by curing the composition under the following conditions, tests were conducted by the methods described below to evaluate viscosity, presence/non-presence of air bubbles after curing, thermal conductivity, adhesive force to Si, retention rate of adhesive force after being stored at high temperature, and retention rate of adhesive force after being stored at high temperature and high humidity. The evaluation results are shown in Tables 1A and 1B.

Viscosity

The viscosity of each prepared composition at 25° C. was measured in accordance with JIS Z 8803:2011. That is, at a measurement temperature of 25° C., and using a B-type viscometer, there was measured a viscosity 2 min after placing the sample. Here, "○" was given to examples where the viscosity was not lower than 1 Pa·s, but lower than 800 Pa·s; "Δ" was given to examples where the viscosity was not lower than 800 Pa·s, but lower than 1,500 Pa·s; "×" was given to examples where the viscosity was not lower than 1,500 Pa·s. The evaluation results are shown in Tables 1A and 1B.

Presence/Non-Presence of Air Bubbles after Curing

Each composition prepared as above was poured into a mold having a diameter of 1 cm and a thickness of 2 mm, followed by heating it at 100° C. for an hour and then at 180° C. for another three hours to obtain a test piece. The presence/non-presence of air bubbles on the surface of the test piece obtained was visually observed. The evaluation results are shown in Tables 1A and 1B.

Thermal Conductivity

The entire test piece that was produced to evaluate the presence/non-presence of air bubbles after curing and had the diameter of 1 cm and the thickness of 2 mm, was coated with carbon black. This coated test piece was also handled as a test piece, and was subjected to a thermal conductivity measurement via a laser flash method (with the aid of LFA 447 Nanoflash by NETZSCH-Geratebau GmbH). The evaluation results are shown in Tables 1A and 1B.

Adhesive Force to Si

Each heat-curable resin composition in the working and comparative examples was separately poured into a mold to produce a circular truncated cone-shaped test piece whose upper surface had a diameter of 2 mm, and whose lower surface had a diameter of 3 mm, with the height of the test piece itself being 3 mm. This test piece was then placed on a Si chip, and cured after being heated at 100° C. for an hour and then at 180° C. for another three hours. After curing, the test piece obtained was cooled to room temperature, and then had its shear adhesive force measured. The measurement results are shown in Tables 1A and 1B.

Heat Resistance

Each heat-curable resin composition in the working and comparative examples was separately poured into a mold to produce a circular truncated cone-shaped test piece whose upper surface had a diameter of 2 mm, and whose lower surface had a diameter of 3 mm, with the height of the test piece itself being 3 mm. This test piece was then placed on a Si chip, and cured after being heated at 100° C. for an hour and then at 180° C. for another three hours. After curing, the test piece obtained was cooled to room temperature, and then had its shear adhesive force measured; the measured value was treated as an initial value.

The test piece that had been cooled to room temperature was then stored in an oven of 150° C. for 150 hours, followed by again cooling the test piece to room temperature so as to measure the shear adhesive force thereof.

A retention rate of adhesive force after being stored at high temperature was calculated by the following formula. The calculated results are shown in Tables 1A and 1B.

Retention rate of adhesive force after storage at high temperature=Shear adhesive force after storage at 150° C. for 150 hours/Initial value×100(%)

Moisture Resistance

Each heat-curable resin composition in the working and comparative examples was separately poured into a mold to produce a circular truncated cone-shaped test piece whose upper surface had a diameter of 2 mm, and whose lower surface had a diameter of 3 mm, with the height of the test piece itself being 3 mm. This test piece was then placed on a Si chip, and cured after being heated at 100° C. for an hour and then at 180° C. for another three hours. After curing, the test piece obtained was cooled to room temperature, and then had its shear adhesive force measured; the measured value was treated as an initial value.

The test piece that had been cooled to room temperature was then stored in a pressure cooker of a high-temperature and high-humidity condition (121° C./humidity 100%/2 atm) for 48 hours, followed by again cooling the test piece to room temperature so as to measure the shear adhesive force thereof.

A retention rate of adhesive force after being stored at high temperature and high humidity was calculated by the following formula. The calculated results are shown in Tables 1A and 1B.

Retention rate of adhesive force after storage at high temperature and high humidity=Shear adhesive force after storage in pressure cooker for 48 hours/Initial value×100(%)

TABLE 1A

| | | Working example 1 | Working example 2 | Working example 3 | Working example 4 | Working example 5 | Working example 6 | Working example 7 | Working example 8 |
|---|---|---|---|---|---|---|---|---|---|
| Heat-curable resin (A1) | | 100 | 100 | 100 | 100 | | | | |
| Heat-curable resin (A2) | | | | | | 100 | 100 | | |
| Heat-curable resin (A3) | | | | | | | | 100 | 100 |
| Thermally conductive filler (B1-1) | | 900 | | | | | | | |
| Thermally conductive filler (B1-2) | | | 900 | | | 800 | | 800 | |
| Thermally conductive filler (B1-3) | | | | 900 | | | 1000 | | 1000 |
| Thermally conductive filler (B1-4) | | | | | 900 | | | | |
| Thermally conductive filler (B2) | | 400 | | | | | | | |
| Thermally conductive filler (B3) | | | 400 | 400 | 400 | 300 | 400 | 300 | 400 |
| Thermally conductive filler (B4) | | 100 | 100 | 100 | 100 | 100 | 100 | 100 | 100 |
| Amine-based curing agent | | 30 | 30 | 30 | 30 | | | | |
| Phenolic curing agent | | | | | | | | 4 | 4 |
| Curing accelerator | | | | | | | | 1 | 1 |
| Polymerization initiator | | | | | | 3 | 3 | | |
| Silicone resin composition | | | | | | | | | |
| Ratio of component (B1) in component (B) | % by mass | 64.3 | 64.3 | 64.3 | 64.3 | 66.7 | 66.7 | 66.7 | 66.7 |
| Viscosity | | ○ | ○ | ○ | ○ | ○ | Δ | ○ | Δ |
| Presence/Non-presence of air bubbles in cured product | | Not observed | Not observed | Not observed | Not observed | Not observed | Not observed | Not observed | Not observed |
| Thermal conductivity | W/m · K | 4.7 | 5.5 | 6.1 | 5.8 | 5.6 | 6.4 | 5.8 | 6.4 |
| Adhesive force to Si | MPa | 26.4 | 31.2 | 33.3 | 26.5 | 17.8 | 22.4 | 38.4 | 36.7 |
| Heat resistance (retention rate of adhesive force after storage at high temperature) | % | 96 | 95 | 95 | 94 | 91 | 95 | 96 | 98 |
| Moisture resistance (retention rate of adhesive force after storage at high temperature and high humidity) | % | 88 | 93 | 82 | 80 | 98 | 95 | 85 | 83 |

TABLE 1B

| | | Working example 1 | Working example 2 | Working example 3 | Working example 4 | Working example 5 | Working example 6 | Working example 7 | Working example 8 |
|---|---|---|---|---|---|---|---|---|---|
| Heat-curable resin (A1) | | 100 | 100 | 100 | 100 | | | | |
| Heat-curable resin (A2) | | | | | | 100 | 100 | | |
| Heat-curable resin (A3) | | | | | | | | 100 | 100 |
| Thermally conductive filler (B1-1) | | 900 | | | | | | | |
| Thermally conductive filler (B1-2) | | | 900 | | | 800 | | 800 | |
| Thermally conductive filler (B1-3) | | | | 900 | | | 1000 | | 1000 |
| Thermally conductive filler (B1-4) | | | | | 900 | | | | |
| Thermally conductive filler (B2) | | 400 | | | | | | | |
| Thermally conductive filler (B3) | | | 400 | 400 | 400 | 300 | 400 | 300 | 400 |
| Thermally conductive filler (B4) | | 100 | 100 | 100 | 100 | 100 | 100 | 100 | 100 |
| Amine-based curing agent | | 30 | 30 | 30 | 30 | | | | |
| Phenolic curing agent | | | | | | | | 4 | 4 |
| Curing accelerator | | | | | | | | 1 | 1 |
| Polymerization initiator | | | | | | 3 | 3 | | |
| Silicone resin composition | | | | | | | | | |
| Ratio of component (B1) in component (B) | % by mass | 64.3 | 64.3 | 64.3 | 64.3 | 66.7 | 66.7 | 66.7 | 66.7 |
| Viscosity | | ○ | ○ | ○ | ○ | ○ | Δ | ○ | Δ |
| Presence/Non-presence of air bubbles in cured product | | Not observed | Not observed | Not observed | Not observed | Not observed | Not observed | Not observed | Not observed |
| Thermal conductivity | W/m · K | 4.7 | 5.5 | 6.1 | 5.8 | 5.6 | 6.4 | 5.8 | 6.4 |
| Adhesive force to Si | MPa | 26.4 | 31.2 | 33.3 | 26.5 | 17.8 | 22.4 | 38.4 | 36.7 |
| Heat resistance (retention rate of adhesive force after storage at high temperature) | % | 96 | 95 | 95 | 94 | 91 | 95 | 96 | 98 |
| Moisture resistance (retention rate of adhesive force after storage at high temperature and high humidity) | % | 88 | 93 | 82 | 80 | 98 | 95 | 85 | 83 |

TABLE 1B-continued

| | | Working example 9 | Working example 10 | Comparative example 1 | Comparative example 2 | Comparative example 3 | Comparative example 4 | Comparative example 5 |
|---|---|---|---|---|---|---|---|---|
| Heat-curable resin (A1) | | 100 | 100 | 100 | 100 | 100 | 100 | |
| Heat-curable resin (A2) | | | | | | | | |
| Heat-curable resin (A3) | | | | | | | | |
| Thermally conductive filler (B1-1) | | | | | 400 | | | 900 |
| Thermally conductive filler (B1-2) | | 1200 | 700 | | | 1200 | 1400 | |
| Thermally conductive filler (B1-3) | | | | | | | | |
| Thermally conductive filler (B1-4) | | | | | | | | |
| Thermally conductive filler (B2) | | | 600 | 900 | 900 | 100 | | |
| Thermally conductive filler (B3) | | 220 | | 400 | | | | 400 |
| Thermally conductive filler (B4) | | | 200 | 100 | 100 | | | 100 |
| Amine-based curing agent | | 30 | 30 | 30 | 30 | 30 | 30 | |
| Phenolic curing agent | | | | | | | | |
| Curing accelerator | | | | | | | | |
| Polymerization initiator | | | | | | | | |
| Silicone resin composition | | | | | | | | 100 |
| Ratio of component (B1) in component (B) | % by mass | 84.5 | 46.7 | 0.0 | 28.6 | 92.3 | 100.0 | 64.3 |
| Viscosity | | ○ | Δ | X | Unmixable | Unmixable | Unmixable | ○ |
| Presence/Non-presence of air bubbles in cured product | | Not observed | Not observed | Observed | | | | Not observed |
| Thermal conductivity | W/m · K | 6.0 | 5.1 | 3.8 | | | | 4.3 |
| Adhesive force to Si | MPa | 30.1 | 29.8 | 19.5 | | | | 0.8 |
| Heat resistance (retention rate of adhesive force after storage at high temperature) | % | 94 | 97 | 94 | | | | 88 |
| Moisture resistance (retention rate of adhesive force after storage at high temperature and high humidity) | % | 94 | 91 | 61 | | | | 65 |

What is claimed is:

1. A thermally conductive resin composition comprising:

(A) 100 parts by mass of a heat-curable resin containing at least one kind selected from an epoxy resin, a cyclic imide compound and a cyanate ester resin; and (B) a thermally conductive filler that has a thermal conductivity of not smaller than 10 W/m·K, and is in an amount of 100 to 3,000 parts by mass per 100 parts by mass of the component (A), wherein the component (B) contains therein 40 to 85% by mass of a thermally conductive filler (B1) that has an average particle size of 35 to 200 μm and a specific surface area of not larger than 0.3 $mm^2/g$.

2. The thermally conductive resin composition according to claim 1, wherein the heat-curable resin (A) contains an epoxy resin having at least two epoxy groups per molecule.

3. The thermally conductive resin composition according to claim 1, wherein the heat-curable resin (A) contains a cyclic imide compound having at least two cyclic imide groups per molecule.

4. The thermally conductive resin composition according to claim 1, wherein the thermally conductive filler (B) is one kind or a combination of at least two kinds selected from zinc oxide, aluminum oxide, silicon oxide, magnesium oxide, aluminum nitride, boron nitride, silicon nitride and metallic silicon.

5. The thermally conductive resin composition according to claim 1, wherein the thermally conductive resin composition is liquid at 25° C.

* * * * *